(12) United States Patent
Guenther

(10) Patent No.: US 9,316,203 B2
(45) Date of Patent: Apr. 19, 2016

(54) BLADE CONNECTION FOR A ROTOR BLADE OF A WIND TURBINE

(71) Applicant: Nordex Energy GmbH, Hamburg (DE)

(72) Inventor: Christian Guenther, Hamburg (DE)

(73) Assignee: Nordex Energy GmbH, Hamburg (DE)

(*) Notice: Subject to any disclaimer, the term of this patent is extended or adjusted under 35 U.S.C. 154(b) by 457 days.

(21) Appl. No.: 13/673,544

(22) Filed: Nov. 9, 2012

(65) Prior Publication Data

US 2013/0121836 A1 May 16, 2013

(30) Foreign Application Priority Data

Nov. 11, 2011 (EP) .................................. 11008966

(51) Int. Cl.
F03D 1/06 (2006.01)

(52) U.S. Cl.
CPC ......... *F03D 1/0658* (2013.01); *F05B 2260/301* (2013.01); *F05B 2280/2004* (2013.01); *F05B 2280/6003* (2013.01); *F05B 2280/702* (2013.01); *Y02E 10/721* (2013.01); *Y02P 70/523* (2015.11)

(58) Field of Classification Search
CPC ..................................................... F03D 1/0658
See application file for complete search history.

(56) References Cited

U.S. PATENT DOCUMENTS

| 4,412,784 | A  | * | 11/1983 | Wackerle et al. ............. 416/230 |
| 7,438,533 | B2 |   | 10/2008 | Eyb et al. |
| 8,133,029 | B2 |   | 3/2012  | Quell et al. |
| 2009/0263250 | A1 | * | 10/2009 | Quell et al. ............... 416/204 R |
| 2010/0084079 | A1 | * | 4/2010  | Hayden et al. ................ 156/189 |
| 2011/0044817 | A1 |   | 2/2011  | Bendel et al. |
| 2012/0148404 | A1 |   | 6/2012  | Quell et al. |
| 2013/0177428 | A1 | * | 7/2013  | Zeller et al. ............... 416/219 A |

FOREIGN PATENT DOCUMENTS

DE 202010013535 U1 * 12/2010 ............. F03D 11/00
GB 2 472 460 A 2/2011

* cited by examiner

*Primary Examiner* — Richard Edgar
(74) *Attorney, Agent, or Firm* — Walter Ottesen, P.A.

(57) ABSTRACT

A blade connection for a rotor blade of a wind turbine having a plurality of receptacles which extend in the longitudinal direction of the rotor blade and can each receive a longitudinal bolt and are in contact with a component having an inner thread for the longitudinal bolt. The rotor blade is manufactured from two materials, at least in the region of the blade connection, wherein a first material is a composite material, and a second material is a composite material provided with at least one reinforcement layer made of metal and/or ceramic. The receptacles are composed of the first material and the second material is bonded to the first material.

5 Claims, 3 Drawing Sheets

BLADE CONNECTION FOR A ROTOR BLADE OF A WIND TURBINE

CROSS REFERENCE TO RELATED APPLICATION

This application claims priority of European patent application no. 11008966.1, filed Nov. 11, 2011, the entire content of which is incorporated herein by reference.

FIELD OF THE INVENTION

The present invention relates to a blade connection for a rotor blade of a wind turbine.

BACKGROUND OF THE INVENTION

United States patent application publication 2011/0044817 discloses a method for fabricating a blade connection of a rotor blade for a wind turbine, in which method attachment elements which are embodied separately are arranged on a circular arc and spaced apart from one another with spacer elements.

U.S. Pat. No. 8,133,029 and United States patent application publication 2012/0148404 disclose a rotor blade connection for a wind turbine, in which rotor blade connection a lateral pin and a connecting device can be operatively connected to one another. In order to increase the flexural strength of the lateral pin it is proposed to provide the latter with a relatively large cross section in the longitudinal direction of the connecting device.

U.S. Pat. No. 4,412,784 discloses a rotor blade in which a longitudinal bolt, which extends in the longitudinal direction of the rotor blade, is secured by a lateral bolt which is guided laterally through the rotor blade. In the region of the longitudinal bolt, a layer with a first material is reinforced by a composite material with cross-wise fiber orientation.

U.S. Pat. No. 7,438,533 discloses a blade connection for a rotor blade in which a bolt it secured in the direction of the rotor blade by a lateral bolt which is guided laterally through the rotor blade. The receptacle of the longitudinal bolt is formed from a hybrid laminate which is formed from alternating layers of glass fibers and carbon fibers, wherein the fibers extend in the longitudinal direction of the blade.

SUMMARY OF THE INVENTION

It is an object of the invention to provide, using simple means, a blade connection for a rotor blade of a wind turbine, which blade connection permits a stable connection of even long to very long rotor blades to the rotor hub.

The blade connection according to the invention is provided and intended for a rotor blade of a wind turbine which can be connected, for example, to a rotor hub or a pitch bearing. The blade connection according to the invention can also be used to connect one rotor blade segment to another rotor blade segment. The blade connection has receptacles, extending in the longitudinal direction of the rotor blade, for, in each case, one longitudinal bolt and, in each case, one component which is provided with an inner thread for the longitudinal bolt and can be arranged in the receptacle for connecting to the longitudinal bolt. In the configuration according to the invention, the rotor blade is manufactured from two materials, at least in the region of the blade connection. According to the invention, a first material is provided which is a composite material, preferably a fiber-reinforced composite material. Furthermore, a second material is provided which is a composite material (hybrid laminate) which is provided with at least one reinforcement layer made of metal and/or ceramic. The hybrid laminate can also contain reinforcement fibers in addition to the reinforcement layers made of metal and/or ceramic. According to the invention, the receptacles are composed completely of the first material. The first material thereby forms at least one lateral surface. The second material, which is significantly more rigid than the first material, is bonded to the lateral surface of the first material in a planar fashion. This means that the receptacle for the longitudinal bolt is formed by the first material, which is bonded in a planar fashion in the region of the blade connection to the second material having reinforcement layers made of metal and/or ceramic. The invention is based on the realization that the blade connection can be manufactured particularly easily if the receptacle for the longitudinal bolt is composed of a conventional composite material. The blade connection is made more rigid by means of a hybrid laminate, which is provided with reinforcement layers made of metal and/or ceramic and is connected to the composite laminate in a planar fashion.

In a further preferred embodiment, a transverse pin with a threaded opening is provided as a component, which transverse pin is inserted into a transverse pin receptacle which runs laterally with respect to the receptacle. The transverse pin, which is inserted into the transverse pin receptacle, serves as a counter support for the longitudinal bolt and applies the acting forces to the rotor blade.

In one preferred embodiment, the first material, which forms the receptacles, forms a circumferential ring with an inner lateral surface and an outer lateral surface, wherein the inner lateral surface points toward the inside of the rotor blade, and the outer lateral surface points toward the outside of the rotor blade. The inside and/or outside of the blade connection are formed by the second material which is connected to the inner lateral surface and/or outer lateral surface of the first material. In this embodiment, the first material extends continuously in the circumferential direction through the rotor blade wall laterally with respect to the transverse pin receptacle. The second material covers the inner lateral surface and/or outer lateral surface of the first material and forms the outer side or inner side of the rotor blade wall, while the first material forms a type of core in the circumferential direction of the rotor blade.

The wall of the transverse pin receptacle is preferably formed at least partially by the second material. With respect to the stability of the blade connection, this means that the transverse pin is least partially surrounded by a second material, which is made significantly more rigid than the first material, which forms the receptacle for the longitudinal bolt.

The wall of the transverse pin receptacle is preferably formed by the second material in its end sections in order to secure the inserted transverse pin. The end sections of the transverse pin receptacle are formed here by the second material which is connected on the outside and/or the inside to the first material which forms the receptacle.

In a second embodiment, the component is embodied as a sleeve with an inner thread. The sleeve is arranged in the receptacle for the longitudinal bolt in the rotor wall.

In one preferred embodiment, the first material, which forms the receptacle, is embodied as a segment of a circular cylinder, wherein each segment has an inner surface, an outer surface and two lateral surfaces. The sleeve can be laminated into the first material in a known manner. The second material is disposed between each two adjacent lateral surfaces of two segments and is connected thereto. This produces a structure along the circumferential direction of the blade connection, in which direction the first and the second material are arranged alternately and the receptacles for the longitudinal bolts and the sleeves are each formed by the first material. The second material, which is arranged between the segments for the longitudinal bolts, reinforces the blade connection in the longitudinal direction of the receptacle. In the circumferential direction, the second material forms a positioning aid for the segments composed of the first material.

In one preferred embodiment, an outer side and/or inner side of the rotor blade is formed by the first material which is bonded to the second material, arranged between the segments, and the outer surface and inner surface of the segments made of the first material.

The first material preferably has an anisotropic or orthotropic design. The reinforcement layers which are contained in the second material behave isotropically, as a result of which the second material has quasi-isotropic properties.

The two described embodiments of the component with the sleeve and transverse pin can also be combined with one another, wherein the sleeve then additionally has an outer thread with which it can threadably engage the transverse pin.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
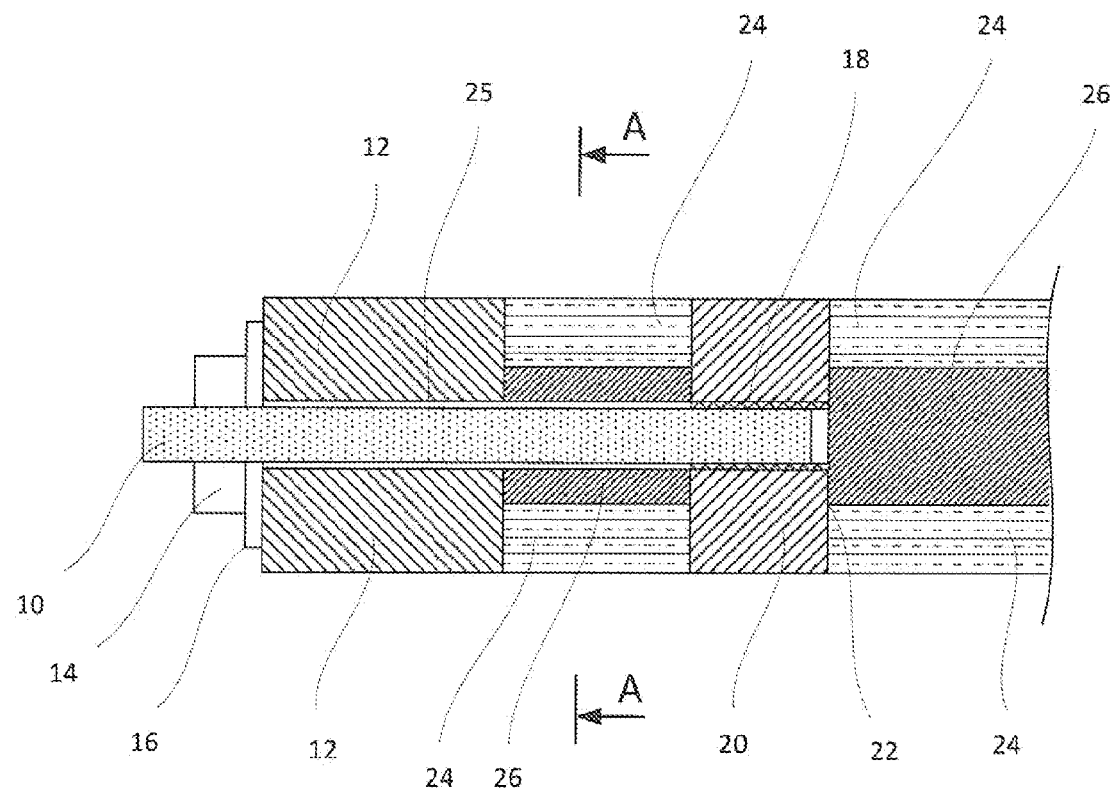
FIG. 1 shows a section through a rotor blade wall in the region of a transverse pin.
Figure 5:
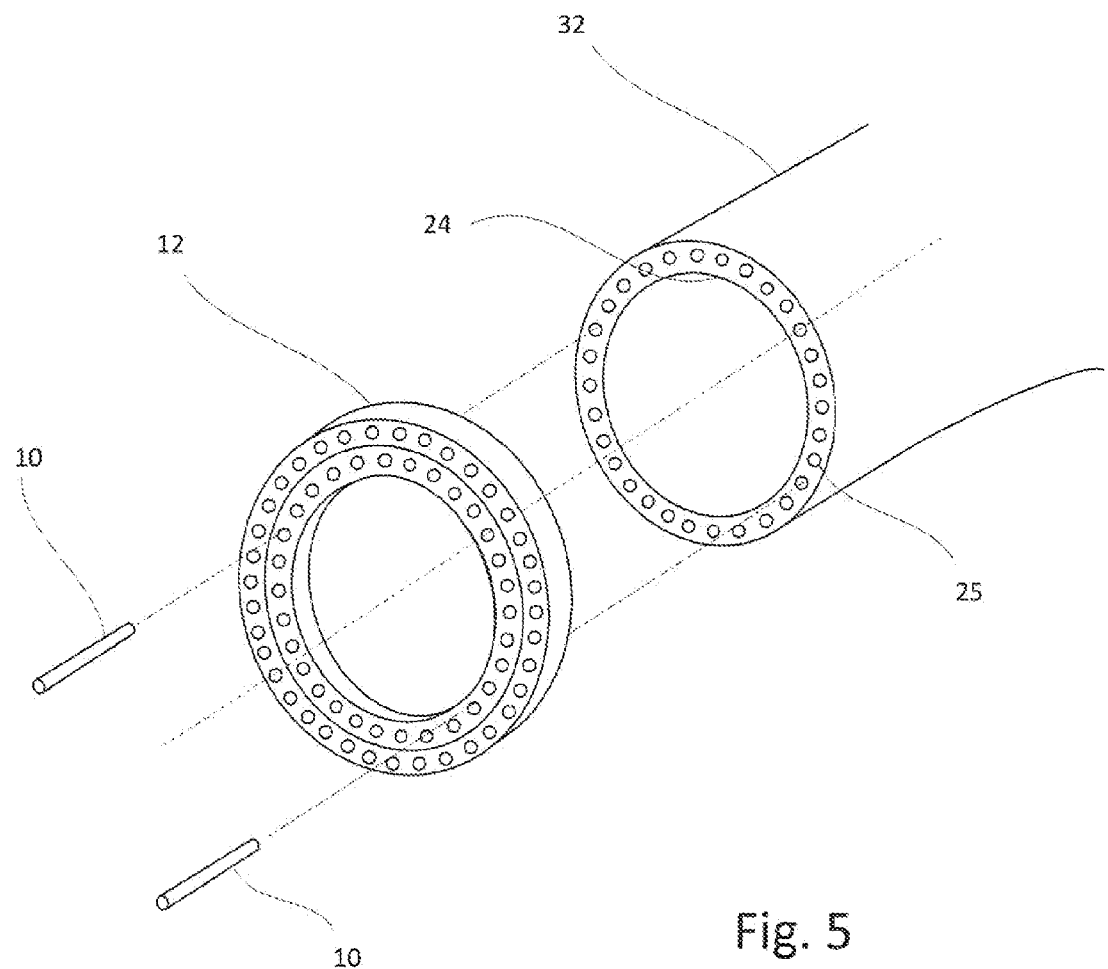
FIG. 5 is an exploded perspective view showing a plurality of receptacles in the connection region of the rotor blade for receiving corresponding ones of a plurality of longitudinal bolts.

FIG. 1 shows a section through a rotor blade connection in which a ring 12 of a pitch bearing is attached to a rotor blade with the aid of a longitudinal bolt 10. The perspective view of FIG. 5 shows receptacles 25 in the blade connection region of the rotor blade. A plurality of longitudinal bolts 10 are received in corresponding ones of the receptacles.

In principle, it is also possible to guide the longitudinal bolts 10 through a corresponding section of the rotor hub. On the hub side, the ring 12 of the pitch bearing is secured on the longitudinal bolt 10 by a nut 14 and a washer 16. The longitudinal bolt 10 has a thread 18 at its end facing toward the rotor blade. The thread 18 threadably engages a transverse pin 20. The transverse pin 20 is inserted through a transverse pin receptacle 22 into the rotor blade wall laterally with respect to the longitudinal direction of the longitudinal bolt 10, and has a drilled hole with an inner thread with which the longitudinal bolt 10 is threadably engaged. The transverse pin receptacle thereby extends through the rotor blade wall from the inside to the outside, or vice versa. The transverse pin receptacle can also be embodied as a drilled blind hole. The inner side and outer side of the rotor blade wall between the transverse pin 20 and the pitch bearing 12 are made of a hybrid laminate 24. The hybrid laminate 24 is formed from a fiber composite material into which reinforcement layers are placed. The reinforcement layers can be made of metal or ceramic. The hybrid laminate has a high degree of rigidity. The region of the receptacle 25 for the longitudinal bolt 10 is formed by a composite material 26 which can be provided with reinforcement fibers, in particular carbon fibers or glass fibers.

On the blade tip side of the transverse pin 20, the hybrid laminate 24 continues over a predetermined region of the rotor blade on the inner side and outer side of the rotor blade wall. In a region (not shown) of the rotor blade, the hybrid laminate can then end and be replaced by the composite material 26 with or without reinforcement fibers. In the blade-tip-side region which adjoins the transverse pin directly, there is the composite material 26 between the hybrid laminate 24, which composite material 26 completely fills the blade-tip-side space behind the transverse pin 20.

Figure 2:
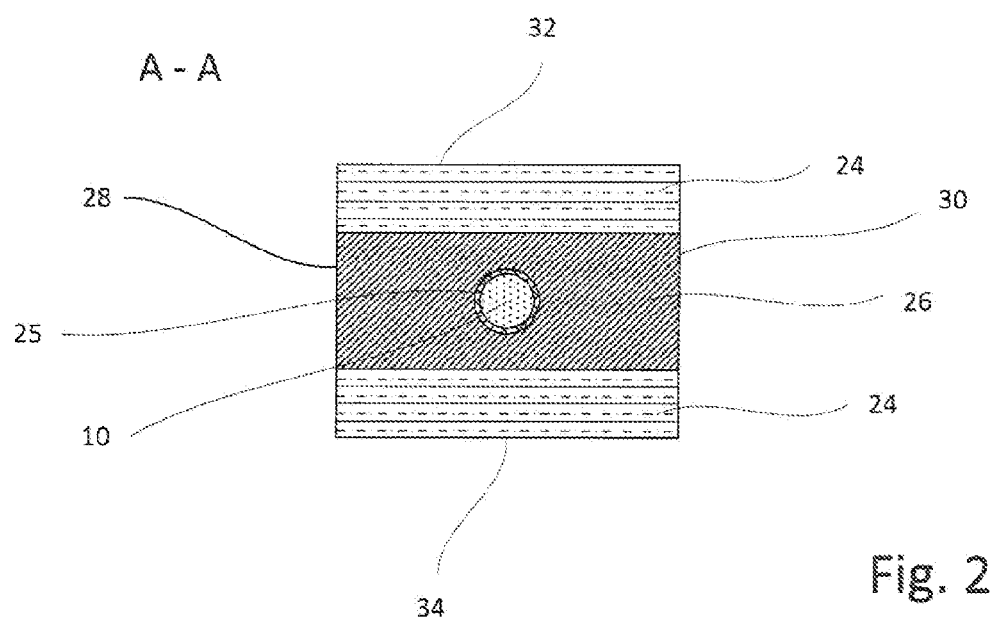
FIG. 2 shows a section along the line A-A of FIG. 1.

FIG. 2 shows a section along line A-A of FIG. 1. The longitudinal bolt 10, which is guided in the receptacle 25, can be clearly seen. The receptacle 25 is completely surrounded by the composite material 26. It is to be noted here that the illustration in FIG. 2 has two sections, and the blade connection continues at the edges 28 and 30, running around in the peripheral direction, with the result that side 32 forms, for example, the outer side and side 34 then forms the inner side of the rotor blade. FIG. 2 shows that the inner region and the outer region of the rotor blade wall are formed in the region of the blade connection by the hybrid laminate 24 which is connected to the composite material 26 in a planar fashion.

Figure 3:
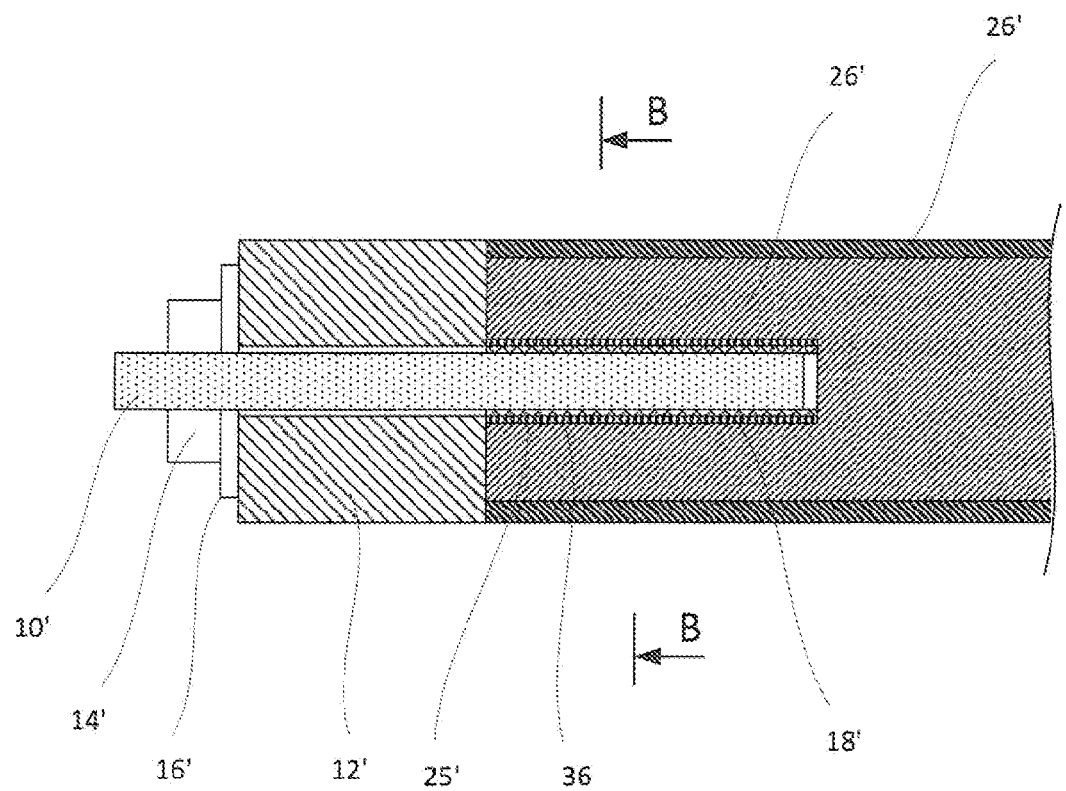
FIG. 3 shows a section through the rotor blade wall in the region of a sleeve.

FIG. 3 shows an alternative embodiment of a rotor blade connection, in which embodiment the longitudinal belt 10' threadably engages a sleeve via a thread 18'. The longitudinal bolt 10' is guided through an inner ring or outer ring of a pitch bearing 12'. The pitch bearing 12' is secured at the rotor-hub-side end of the longitudinal bolt 10' by a nut 14' and a washer 16'.

The sleeve 36' is arranged in the receptacle 25' for the longitudinal bolt 10' and extends to the rotor-hub-side end of the rotor blade. The sleeve 36' is laminated into a composite material 26' which forms a segment of the substantially circular cylindrical rotor blade wall. The composite material 26' is surrounded in the radial direction by a cover layer made of the same, or of a different conventional, composite material 26", which forms the outer side 32' and the inner side 34' of the rotor blade wall.

Figure 4:
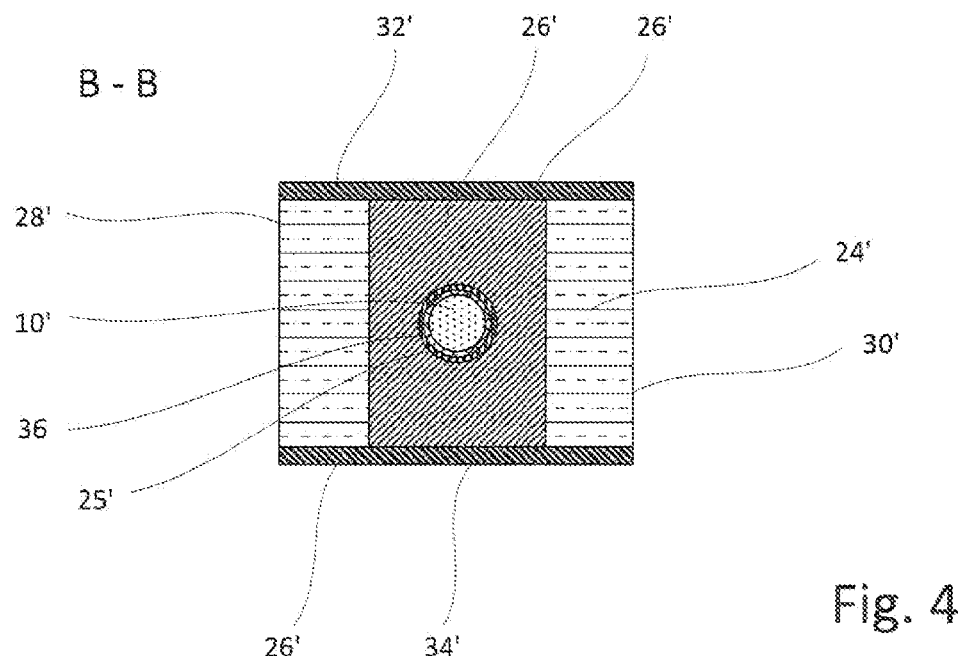
FIG. 4 shows a section along the line B-B of FIG. 3.

FIG. 4 shows a section along the line B-B of FIG. 3. The inner sleeve 36' with the longitudinal bolt 10' is embedded in a receptacle made of composite material 26'. The receptacle is configured as a segment of a circular cylinder. The composite material 26' surrounds the sleeve 36' completely and forms a covering. The illustration in FIG. 4 also has two cut sections, with the result that the blade connection continues at the edges 28' and 30', running in the circumferential direction. The side 32' forms, for example, the outer side and the side 34' forms the inner side of the rotor blade wall.

As can be seen in FIG. 4, the hybrid laminate 24' is, in the circumferential direction of the blade connection, arranged between two mutually adjacent segments with the receptacles 25'. The hybrid laminate 24' is connected in a planar fashion to the side surface of the segments which surround the receptacle 25'. The outer side 32' and the inner side 34' of the rotor blade wall are each covered by a layer made of composite material 26".

In a region (not shown in FIG. 3) of the rotor blade wall, the hybrid laminate 24' can end in its thickness, preferably in the shape of a wedge, with the result that the rotor blade wall is then formed completely from the composite material 26'.

It is understood that the foregoing description is that of the preferred embodiments of the invention and that various changes and modifications may be made thereto without departing from the spirit and scope of the invention as defined in the appended claims.

What is claimed is:

1. A blade connection for a rotor blade of a wind turbine, said rotor blade defining a longitudinal direction and having blade connection region, said blade connection comprising:
a plurality of longitudinal bolts;
a plurality of threaded components each having an inner thread configured for one of said longitudinal bolts;
a plurality of receptacles extending in said longitudinal direction of said rotor blade and each one of said receptacles being configured to receive one of said threaded components and one of said longitudinal bolts;
said rotor blade being, at least in said connection region, made of a first material and a second material;
said first material being a composite material and having a first rigidity;
said second material being a hybrid laminate material having at least one reinforcement layer of at least one metal and ceramic and said second material having a second rigidity greater than said first rigidity of said first material;
said first material defining said receptacles;
said second material being bonded to said first material, and
said threaded components each being configured as a sleeve defining said inner thread and each being arranged in a corresponding one of said receptacles.

2. A blade connection for a rotor blade of a wind turbine, said rotor blade defining a longitudinal direction and having a blade connection region, said blade connection comprising:
a plurality of longitudinal bolts;
a plurality of threaded components each having an inner thread configured for one of said longitudinal bolts;
a plurality of receptacles extending in said longitudinal direction of said rotor blade and each one of said receptacles being configured to receive one of said threaded components and one of said longitudinal bolts;
said rotor blade being, at least in said connection region, made of a first material and a second material;
said first material being a composite material and having a first rigidity;
said second material being a hybrid laminate material having at least one reinforcement layer of at least one of metal and ceramic and said second material having a second rigidity greater than said first rigidity of said first, material;
said first material defining said receptacles;
said second material being bonded to said first material;
said threaded components being each configured as a sleeve defining said inner thread and being each arranged in a corresponding one of said receptacles;
said first material defining said receptacles and being configured as a segment of a circular cylinder;
said circular cylinder having an inner surface, an outer surface and two end surfaces; and,
said second material being disposed between each two mutually adjacent lateral surfaces of two segments and being bonded thereto.

3. The blade connection of claim 2, wherein said rotor blade has an inner side and an outer side; at least one of said inner and said outer sides of said rotor blade is made of said first material and bonds to at least one of said segments made of said first material and said second material which is arranged between the segments.

4. A blade connection assembly for a rotor blade of a wind turbine, said rotor blade defining a longitudinal direction and having a blade connection region, said blade connection assembly comprising:
an annular bearing member having a plurality of bores formed therein;
a plurality of longitudinal bolts accommodated in corresponding ones of said bores for securing said annular bearing member to said rotor blade;
a plurality of threaded components each having an inner thread configured for one of said longitudinal bolts;
a plurality of receptacles extending in said longitudinal direction of said rotor blade and each one of said receptacles being configured to receive one of said threaded components and one of said longitudinal bolts;
said rotor blade being, at least in said connection region, made of a first material and a second material;
said first material being a composite material and having a first rigidity;
said second material being a hybrid laminate material having at least one reinforcement layer of at least one of metal and ceramic and said second material having a second rigidity greater than said first rigidity of said first material;
said first material defining said receptacles;
said second material being bonded to said first material;
said threaded components being each configured as a sleeve defining said inner thread and being each arranged in a corresponding one of said receptacles;
said first material defining said receptacles and being configured as a segment of a circular cylinder;
said circular cylinder having an inner surface, an outer surface and two end surfaces; and,
said second material being disposed between each two mutually adjacent lateral surfaces of two segments and being bonded thereto.

5. The blade connection assembly of claim 4, wherein said rotor blade has an inner side and an outer side; at least one of said inner and said outer sides of said rotor blade is made of said first material and bonds to at least one of said segments made of said first material and said second material which is arranged between the segments.

* * * * *

UNITED STATES PATENT AND TRADEMARK OFFICE
CERTIFICATE OF CORRECTION

PATENT NO.         : 9,316,203 B2                                   Page 1 of 1
APPLICATION NO.    : 13/673544
DATED              : April 19, 2016
INVENTOR(S)        : Christian Guenther It is certified that error appears in the above-identified patent and that said Letters Patent is hereby corrected as shown below:

In the specification

In Column 1:
Line 39: delete "it" and insert -- is -- therefor.

In Column 2:
Line 48: insert -- at -- before "least".

In Column 4:
Line 26: delete "belt" and insert -- bolt -- therefor.
Line 27: insert -- 36' -- after "sleeve".

In the claims

In Column 5:
Line 17: insert -- of -- before "metal".

Signed and Sealed this
Nineteenth Day of July, 2016

Michelle K. Lee
*Director of the United States Patent and Trademark Office*